Feb. 16, 1926.                                      1,572,936
                        R. KEMP
                   METHOD OF MOLDING
                 Filed August 23, 1921
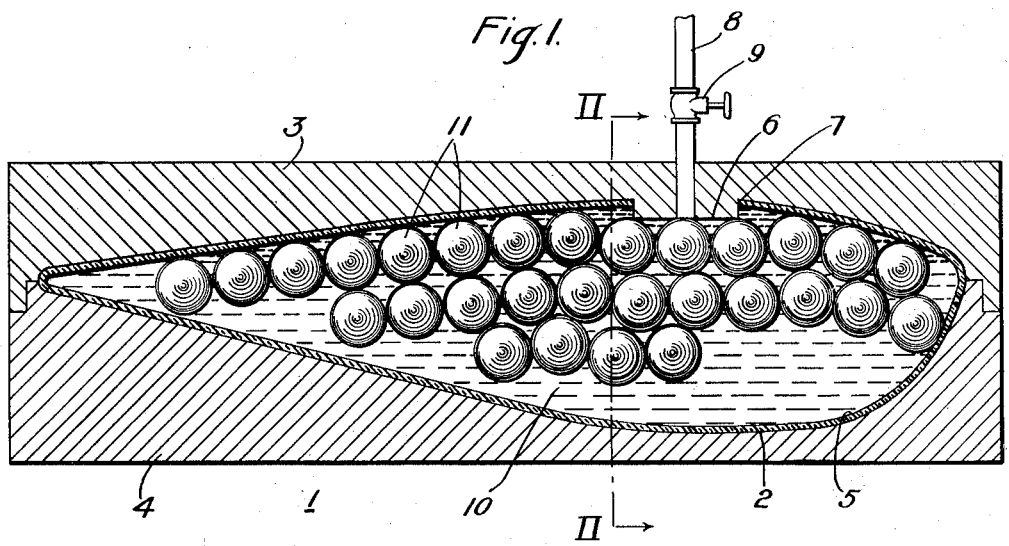
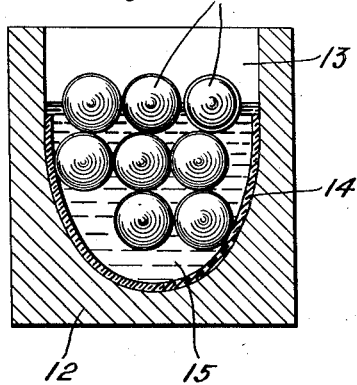
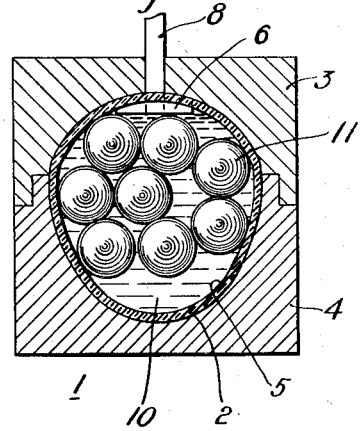
WITNESSES:                                    INVENTOR
H. J. Shelhamer                              Robert Kemp
W. H. Woodman.                                   BY
                                         Wesley S. Carr
                                             ATTORNEY Patented Feb. 16, 1926.

1,572,936

UNITED STATES PATENT OFFICE.

ROBERT KEMP, OF CHICAGO, ILLINOIS, ASSIGNOR TO WESTINGHOUSE ELECTRIC & MANUFACTURING COMPANY, A CORPORATION OF PENNSYLVANIA.

METHOD OF MOLDING.

Application filed August 23, 1921. Serial No. 494,517.

*To all whom it may concern:*

Be it known that I, ROBERT KEMP, a citizen of the United States, and a resident of Chicago, in the county of Cook and State of Illinois, have invented a new and useful Improvement in Methods of Molding, of which the following is a specification.

My invention relates to the molding of composite bodies and, more particularly, hollow bodies, and it has, for its primary object, the provision of a simple and effective method of molding bodies of this character and of large size through the employment of a core or pressure-applying member of relatively fusible material.

By methods heretofore employed, molding of relatively large hollow bodies has been difficult and, commercially, practically impossible because of the cost of the molds required. Furthermore, if the hollow body has only a relatively small opening, the core, if of a permanent character, must be very complicated in construction to permit its removal from the molded body. Also presses of extraordinary size must be employed to close the mold about the body and its core if large bodies are being molded.

It has been proposed to mold hollow bodies by the employment of a core which may be solid at normal temperatures but which will be fused or melted at the molding temperatures employed. When employing such a core, internal pressure may be applied by forcing a fluid against the core and this fluid may well consist of the same material as the core. Fusible cores of this character are commonly formed of a suitable, low-melting-point alloy and, as such alloys are relatively expensive, it has not previously seemed expedient to employ them in molding large bodies, such as fuselages for aircraft, pontoons for hydroplanes, boats and the like.

In view of these facts, one object of my invention consists in providing means for dispensing with the use of a relatively large proportion of the fusible core material, which would ordinarily be necessary, without, in any way, affecting the results obtained.

With these and other objects in view, my invention will be more fully described, illustrated in the drawings, in the several views of which corresponding numerals indicate like parts, and then particularly pointed out in the claims.

Fig. 1 is a central, vertical, longitudinal, sectional view of a mold and enclosed body disclosing one embodiment of my invention; Fig. 2 is a transverse, sectional, view taken on the line II—II of Fig. 1, and Fig. 3 is a similar view disclosing another method of practising my invention.

While my invention may be employed in molding hollow bodies of different characters and may be practiced in a variety of ways and with numerous moldable compositions, it is primarily intended for molding large hollow bodies, such as the fuselages and pontoons of aircraft, boats and the like, from a composition comprising fibrous material impregnated with a binder which may be hardened under heat and pressure as, for example, a phenolic condensation product, such as bakelite.

In practising my invention, I may provide a core consisting, at least in part, of a suitable material having a relatively low fusing point, and I may assemble a body of the moldable material about the core and dispose the body and its enclosed core within a suitable mold. Heat may then be applied, in any suitable manner, to fuse the core, and fluid pressure may be exerted against the fused core to force it into engagement with the enclosing body and so compress the body that it may be cured in a compact, solid form.

While various fillers, particularly of a fibrous character, may be employed, with the phenolic condensation product as a binder, I prefer to utilize fibrous sheet material, such as paper, duck or the like, impregnated with the binder, and to superimpose layers of this material to build up a body of the desired thickness about the core.

Referring more particularly to Figs. 1 and 2 of the drawings, I have disclosed a mold 1 designed to mold a fuselage 2 and comprising upper and lower mold members 3 and 4 which, in closed position, provide a mold chamber 5. The upper mold member may be provided, at a suitable point, with an inwardly projecting boss 6 to seat within a cock-pit opening 7 of the body being molded, and a pipe 8 may be extended through this boss in order that fluid, under pressure, may be introduced to the mold, the admission of this fluid being controlled by a valve 9.

My present invention relates more particularly to the core which is employed and which, as shown in the drawing, may comprise a body 10 of the proper shape and size formed of a suitable material, such as an alloy comprising two parts bismuth, one part tin, and one part lead, which will fuse or melt at a relatively low temperature and in which are imbedded a plurality of relatively infusible filler members 11 which may be of any desired shape and size. The members 11 may preferably be of a material having a slightly lower specific gravity than that of the fusible material in order that they may float in it when the fusible material is in a molten condition but, within this limit, they may desirably be as heavy as possible in order that their weight may supplement the pressure applied by the core.

With a body to be molded, assembled about the core and positioned in the mold, heat may be applied to the mold to fuse the fusible portion of the core, or this fusing may be accomplished by steam or electric heating coils which may be imbedded in the core. When the fusible portion of the core has been liquefied, pressure may be applied from any source of fluid supply, such as additional core-forming material, through the pipe 8 to cause expansion of the core and consequent compression of the body being cured between the core and the mold members. After the body has been cured, the fusible core may be drawn off in any suitable manner, as by the employment of a siphon, the mold may be cooled and opened, the filling members 11 may be removed from the cured body and the body may be removed from the mold.

From the foregoing description, it will be apparent that relatively large hollow bodies having one or more relatively small openings may be readily molded by practising my invention without the necessity of employing hydraulic presses and with a relatively small amount of fusible core material. Obviously, the core may be cast in a single piece or in sections, as preferred, and the assembling of the body about the core and their disposal within the mold may be accomplished in any desired manner.

In Fig. 3 I have illustrated a slight modification of my invention which may be employed in molding large, hollow, open bodies, such as boats and the like. As here indicated, I may employ an open mold 12 having a mold chamber 13, of proper size and shape, opening through the top of the mold, and I may assemble the body 14 of moldable material within this chamber. Fluid-pressure-applying material 15 may then be run into the body, thus assembled, and filler members 16, corresponding to the members 11 of Figs. 1 and 2, may be added to decrease the amount of the fluid material 15 required. The fluid material 15 may preferably be of the same character as that employed in forming fusible cores and, if a sufficient head of this material and of the filler members is provided sufficient pressure will be exerted against the body 14 to compact it and insure proper curing. The fusible material of the core, or pressure-applying element may be maintained in a heated condition either by heating the mold by any suitable means or by the employment of steam or electric heating coils.

By this means, I have provided a simple and relatively cheap method of molding large, hollow, even bodies which requires only a one-part mold and no press or pressure-applying pumps or the like. After the body has been cured, the still fused portion of the core may be drawn off by a siphon, or other means, the mold may be cooled, the filler members 16 may be removed and the molded body may be lifted from the mold.

As it is apparent that my invention is susceptible of a wide range of application and that various modifications may be desirable, in adapting it for use in molding different bodies, it will be understood that no limitations are to be imposed other than those indicated in the appended claims.

I claim as my invention:

1. Apparatus for use in molding comprising a pressure-applying member composed in part of a material having a relatively low fusing point and in part of a material having a relatively high fusing point.

2. Apparatus for use in molding comprising a core composed in part of an alloy having a relatively low melting point and in part of filler members of a material having a relatively high melting point.

3. The method of molding hollow bodies which comprises disposing the body with its outer surface in engagement with a mold, disposing pressure-applying means, including a body composed in part of material having a relatively low fusing point and in part of a material having a relatively high fusing point, in engagement with the inner face of the body to be molded, applying heat to fuse the material having a relatively low fusing point and applying pressure to force such fused material against the body being molded.

4. The method of molding hollow bodies which comprises providing a core of a relatively fusible material in which are imbedded a plurality of filler members of relatively infusible material, assembling the body about the core, depositing the body and its core in a mold, applying heat to melt the readily fusible material of the core and applying pressure to the core to expand it and compact the body.

In testimony whereof, I have hereunto subscribed my name this 18th day of August, 1921.

ROBERT KEMP.